May 22, 1962 R. W. BALTOSSER ETAL 3,035,479
ANALYZING METHODS EMPLOYING OPTICAL GRATICULES
Filed April 1, 1957 6 Sheets-Sheet 1

INVENTORS
ROBERT W. BALTOSSER AND
STANLEY W. WILCOX

BY Mason, Kolehmainen, Rathburn and Wyss.

ATTORNEYS

May 22, 1962  R. W. BALTOSSER ETAL  3,035,479
ANALYZING METHODS EMPLOYING OPTICAL GRATICULES
Filed April 1, 1957  6 Sheets-Sheet 2
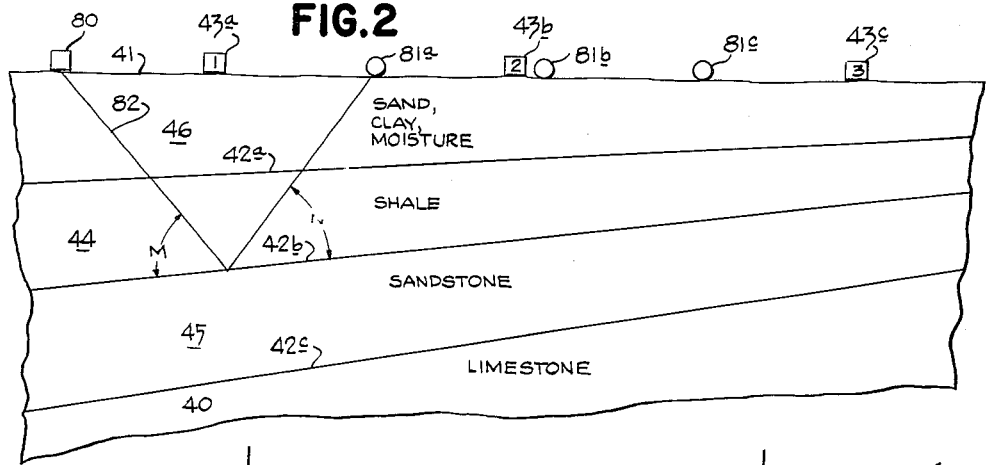
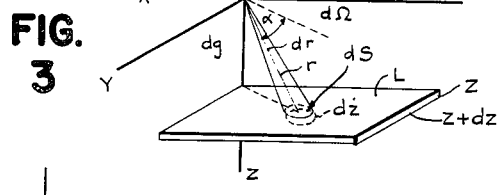
FIG. 3
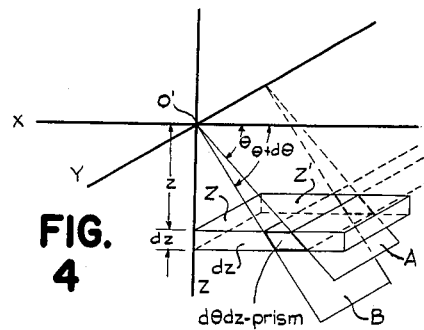
FIG. 4
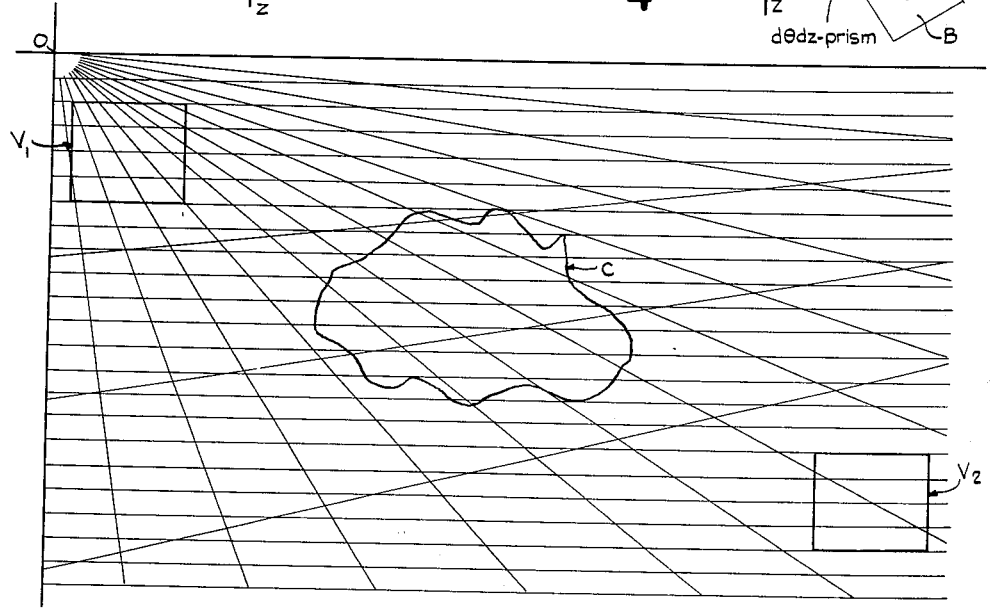
FIG. 5
INVENTORS
ROBERT W. BALTOSSER AND
STANLEY W. WILCOX May 22, 1962 R. W. BALTOSSER ETAL 3,035,479
ANALYZING METHODS EMPLOYING OPTICAL GRATICULES
Filed April 1, 1957 6 Sheets-Sheet 3

GRAVITY CORRECTION CURVE

INVENTORS
ROBERT W. BALTOSSER AND
STANLEY W. WILCOX
BY
*Mason, Kalehmainen, Rathbrun and Wyss.*
ATTORNEYS May 22, 1962 R. W. BALTOSSER ETAL 3,035,479
ANALYZING METHODS EMPLOYING OPTICAL GRATICULES
Filed April 1, 1957 6 Sheets-Sheet 4

INVENTORS
ROBERT W. BALTOSSER AND
STANLEY W. WILCOX
BY
ATTORNEYS

INVENTORS
ROBERT W. BALTOSSER AND
STANLEY W. WILCOX

United States Patent Office 3,035,479
Patented May 22, 1962

3,035,479
ANALYZING METHODS EMPLOYING
OPTICAL GRATICULES
Robert W. Baltosser, Broken Arrow, and Stanley W. Wilcox, Tulsa, Okla., assignors to Seismograph Service Corporation, Tulsa, Okla., a corporation of Delaware
Filed Apr. 1, 1957, Ser. No. 650,016
22 Claims. (Cl. 88—14)

The present invention relates generally to analyzing methods and, more specifically, to methods and apparatus for comparing characteristic values derived from a simulated or synthetic cross section of subsurface formations with characteristic values actually measured at the surface of the earth.

Although not limited thereto, the present invention is well suited for use in the geophysical field wherein it is desired to produce an accurate simulated profile or cross section of subsurface formations depicting the composition or characteristics of different strata or masses in the formations in order to facilitate analysis and interpretation by the geophysicist. Different types of geophysical surveys yield information indicative of different characteristics of these subsurface formations. By utilizing the characteristic values obtained from such surveys, the apparatus of the present invention can be employed to facilitate production of simulated or synthetic profiles illustrating the configuration, location and composition of the subsurface strata or masses making up the formation. Among the many characteristic values of subsurface formations measured during geophysical surveys of the type referred to above are "gravitational force field" values measured at the earth's surface and "travel time" values of elastic wave energy transmitted through the formations. While the present invention is useful for many applications, one of its principal uses is to provide a simulated "gravitational force field" value from the synthetic profile for comparison with the measured "gravitational force field" value of the formation represented by the profile. Another application of the present invention is its use in facilitating production of a simulated "travel time" value from the synthetic profile for comparison with the measured "travel time" value of the elastic wave energy propagated through the formation represented by the profile. In the former case, a variable characteristic, the specific gravity of the various subsurface strata or masses, is depicted on the synthetic cross section and is adapted to be altered until the simulated and measured gravitational force field values are equal, thereby to determine that the synthetic cross section accurately portrays the configuration and the specific gravities of the various strata or masses. In the latter case, another variable characteristic, namely, the velocity of propagation of the different strata or masses, is depicted on the profile and is altered until the simulated value coincides with the measured value, whereupon the profile accurately represents the configuration and the velocities of propagation of the various strata and masses. The specific gravities of various subsurface structures which are expected to be encountered beneath certain locations and the velocities of propagation of various subsurface structures both may be estimated by reference to prior surveys conducted in the same general vicinity or, alternatively, a borehole may be drilled through the structures and equipment lowered into the hole either to capture specimens of or to measure electrical characteristics of the particular strata and masses in the structures. Additionally, as is well known, elastic wave energy generated from a shot point or the like and reflected from various subterranean interfaces in the formations may be detected by one or more seismometers and the travel time of the elastic wave energy through the subsurface formations, i.e., from the shot point down to a particular interface and up to one of the seismometers, may be determined by measuring the time interval between the propagation of the energy and its arrival at the seismometers.

The present invention will first be considered in conjunction with a gravity survey. During such a survey, the vertical component of the gravitational force field of a particular subsurface formation is recorded by conventional gravity instruments located at spaced apart testing stations at the surface of the earth. Many of the most common geological structures, for example, folding parallel to a given parallel axis, parallel faulting, ridge and valley topography resulting from the erosion of folded structures, can be considered to have an infinite dimension perpendicular to their vertical cross sections, and, accordingly, these structures may be said to have a two-dimensional mass distribution and may be represented by a vertical profile. This is at best an approximation, but by the use of well-known mathematical solutions, the gravitational effect attributed to a specific structure, which has roughly a two-dimensional mass distribution, may be computed with reasonable and satisfactory accuracy. Moreover, these geologic structures which have a finite dimension perpendicular to the vertical profile may be said to have a three-dimensional mass distribution. Generally speaking, it has been observed that a unit volume of formation having a constant specific gravity contributes more to the vertical component of the gravitational force field when it is vertically aligned with and at a shallow depth with respect to the gravity recording station than when it is located off of the vertical and/or is at a greater depth. This observation is substantiated by the mathematical solutions referred to above.

In order to simplify the determination of the gravity effect of an irregular body having two-dimensional mass distribution upon a point on the surface of the earth, so-called vertical section graticule charts, which are subdivided into a multitude of unit sections, are conventionally employed. The irregular body is outlined on the graticule charts and the unit sections falling within the irregular body are summed or counted to provide an indication of the total gravity effect of the body.

The summation of the unit sections and the determination of the fractional part of the unit sections lying within the irregular body have proven to be difficult and time-consuming operations. Moreover, inaccuracies are introduced by the approximation of the fractional parts of the unit sections lying within the irregular body. Accordingly, it would be desirable to provide an apparatus for computing the gravitational effect of subsurface bodies or strata having either two or three dimensional mass distributions.

Therefore, it is an object of the present invention to provide an improved method for facilitating production of a simulated profile or cross section of a portion of the subsurface formations, part sof said cross section being shaded to represent the specific gravity of the corresponding strata of said formations.

More generally, it is an object of the present invention to provide improved methods for developing a field, such as a light field, having a predetermined distribution representative of a desired potential or force field, for then modifying the magnitude of the field in predetermined areas by imposing suitable controls thereon, and finally performing a mathematical operation, such as integration, on the modified field to obtain an indication.

Still another object of the present invention is to provide an improved method for facilitating production or sketching of a simulated cross section of subsurface structures, which simulated cross section is adapted to be quickly constructed and easily modified.

It is a further object of the present invention to provide an improved method for producing a synthetic profile of subsurface formations, which profile may be employed to obtain a simulated characteristic value for comparison with a characteristic value actually measured at the surface.

It is another object of the present invention to determine the value of either a simulated vertical component of the gravitational force field or a simulated travel time of elastic wave energy from a synthetic profile for comparison with measured data so that the optical qualities of selected portions of the synthetic profile may be altered until the simulated value corresponds to the measured data.

It is also an object of the present invention to provide a method in which a light field corresponding to a characteristic of a homogeneous mass is modified in accordance with variations in the composition of the subsurface formations and the modified light field is optically integrated or summed to provide a simulated value representative of the characteristic attributable to the subsurface formations.

A further object of the invention is to provide an improved method according to the preceding object wherein the light field is modified by means of a synthetic profile having optical transmissibility or density qualities which may be varied by changing the shading of selected portions of the profile corresponding to different strata in the subsurface formations, thereby to alter the simulated characteristic value obtained.

It is likewise an object of the present invention to provide an improved method according to the preceding object in which the gravitational force field value obtained may be compared with a measured value of the actual gravitational force field so that any deviation may be corrected by altering the shading on the synthetic profile until the simulated value obtained corresponds to the measured value.

It is yet another object of the present invention to provide an improved method wherein a light field corresponding to a transit time-distance field is modified in accordance with variations in the velocity of propagation of different portions of the subsurface formations so that the modified light field may be utilized to provide a simulated value representative of the travel time of elastic wave energy through the subsurface formations over a path of predetermined length.

It is still another object of the present invention to provide a new and improved method of obtaining an accurate simulated profile of a portion of a subsurface formation or structure.

Yet another object of the present invention is to provide an improved method for producing an energy field representative of the gravitational force field of subsurface formations.

Another object of the present invention is to provide an improved method for using a novel optical graticule for converting a light field having uniform distribution into one having a non-uniform distribution corresponding to the gravitational force field of a homogeneous mass.

The above and other objects may be realized, in accordance with one form of the present invention used in conjunction with a gravity survey where the subsurface strata possess two-dimensional mass distribution, by the provision of an apparatus developing a light field which is modified by a gravity graticule to obtain a light field corresponding to a gravitational force field for a homogeneous mass having a two-dimensional mass distribution. A simulated profile or geologic cross section representing a vertical cross section of the subsurface formation is disposed within the modified light field to again alter the light field developed by the graticule. The vertical cross section comprises a plurality of side-by-side sections representative of adjacent regions of the subsurface formations and formed on a transparent medium having a plurality of lines thereon respectively representing the earth's surface and buried interfaces bounding the subsurface strata. With one of the above-described sections of the simulated profile interposed in the path of the light field from the graticule, portions of the medium may be altered by shading until the optical transmissibility or density of these portions corresponds to the specific gravity of the respective subsurface strata. The gravity graticule and the geologic cross section combine to control the amount of light transmitted to a light responsive measuring circuit which integrates or sums the light to provide an indication representative of the vertical component of the gravitational force field measured at the earth's surface above the particular region corresponding to the section intercepting the light field. The indication obtained is compared with the gravitational field measured at a testing station located on the earth's surface over the particular region referred to above. If a discrepancy exists between the indicated and measured values, portions of the simulated profile section exposed to the graticule light field are altered in optical transmissibility to change the magnitude of the light reaching the light measuring circuit until the indicated value corresponds to the measured gravitational force field. Adjacent sections of the simulated profile are successively moved into the path of the light field developed by the graticule and the described procedure is repeated for each section so that the entire simulated profile accurately depicts the shape, location and specific gravity of the subsurface strata.

For subsurface formations having three-dimensional mass distribution, a different graticule is employed to alter the light field and a geologic cross section representing a horizontal layer of the subsurface formations is disposed in the path of the light field from the graticule. The horizontal cross section also comprises a transparent medium on which are defined a plurality of intersecting lines representing the intersection of a horizontal layer with the subsurface interfaces. Different portions of the cross section thus represent the various structures making up the horizontal layer and each of these portions is shaded to correspond to the specific gravity of the structure which it represents. The gravitational effect of the layer, is, of course, determined by integrating the light field passed by the horizontal cross section. A series of horizontal cross sections each representative of a different horizontal layer are employed and a simulated gravitational value is obtained for each cross section. The total gravitational effect of the subsurface formations may then be determined by adding up or totaling the individual simulated values obtained for each cross section.

In accordance with another form of the present invention used in cases where the simulated and measured characteristic value of the subsurface formation is the travel time of the elastic wave energy transmitted through the formations, the apparatus develops a light field corresponding to a travel time versus distance distribution field for a homogeneous mass. Since elastic wave energy is propagated through a homogeneous mass at the same velocity in all directions this light field has a uniform distribution. In this form of the invention, the graticule is not used and is simply removed from the apparatus. A simulated profile or geologic cross section representing a vertical cross section of the subsurface formation is disposed within the light field to alter the light field in accordance with non-homogeneties in the formation. To this end, portions of the vertical cross section corresponding to the non-homogeneities are then so shaded that the optical transmissibility or density of each portion corresponds to the velocity of propagation of the structure which it represents. The path of travel of the elastic wave energy as it passes from the earth's surface and is reflected from an interface back to the surface may be simulated by drawing a heavy line along a corresponding path on the cross section. The heavy line reduces the amount of light transmitted through the cross section, and since the total light detected by the light responsive means is a linear function of the length of the path in terms of travel time, a simulated travel time value is provided by the measuring circuit. As above, if a discrepancy exists between the simulated travel time value and the travel time actually measured, the cross section does not accurately portray the configuration and velocity of propagation characteristic of the subsurface formation. Accordingly, all or selected portions of the profile or geologic cross section are altered in optical transmissibility or density to change the magnitude of the total light reaching the light measuring circuit until the simulated travel time value corresponds to the measured travel time value. Adjacent sections of the simulated cross section are successively moved into the path of the uniform distribution light field and the above described procedure repeated for each section until the entire simulated cross section has been properly shaded to represent the configuration, location and velocity of propagation of each of the subsurface strata or masses.

The invention both as to its organization and method of operation, together with further objects and advantages thereof, will best be understood by reference to the following specification taken in connection with the accompanying drawings, in which:

FIG. 2 is a fragmentary profile of typical subsurface structures showing several subsurface interfaces and a plurality of testing stations at which the gravitational force field value is recorded during a gravity survey, and showing a seismometer array at which travel time value of elastic wave energy is recorded;

FIG. 3 is a perspective view of a geometric figure useful in explaining and computing the gravitational attraction of an infinite plane lamina;

FIG. 4 is a perspective view of a geometric figure useful in explaining and computing the gravitational effect of a so-called $d\theta dz$ prism;

FIG. 5 is a two-dimensional chart which is useful in calculating the gravitational attraction of an irregular body of two-dimensional distribution by areal integration of $d\theta dz$ prisms;

Figure 1:
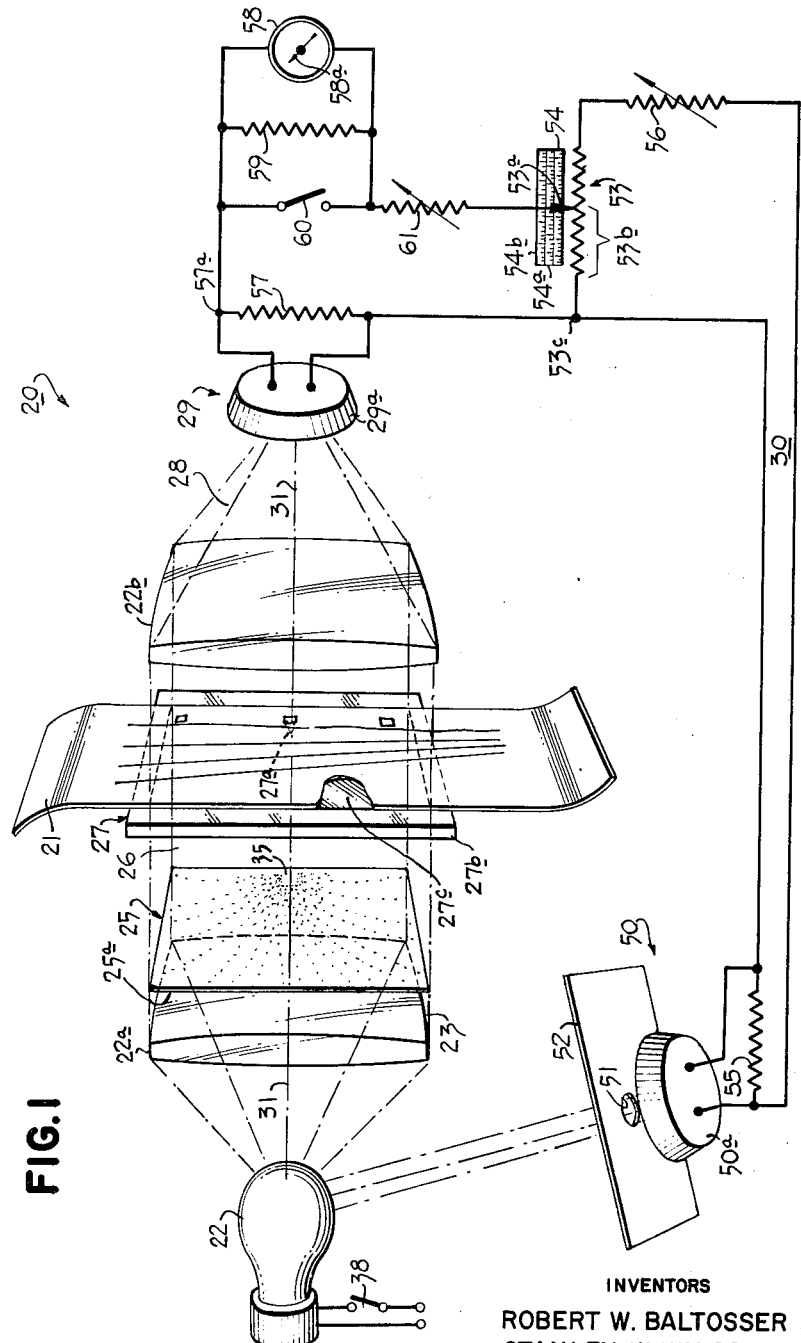
FIG. 1 is a partially schematic and partially diagrammatic view of apparatus characterized by the principles of the present invention and used in the production of a simulated profile of a portion of subsurface strata.

Referring now to the drawings, it is believed that the present invention will best be understood by first determining mathematically the gravitational effect of a homogeneous density mass relative to a point located on the earth's surface. Once the gravitational contribution for the unit mass is obtained as a function of depth and angular position relative to the point, then the gravitational contribution for a specific homogeneous structure, which underlies the point and consists of a multitude of unit masses, may be obtained by an integration process.

The mathematical analysis is founded upon the derivation of an expression for the gravitational attraction of a plane lamina lying beneath a point of reference. Thus, in FIG. 3, the plane lamina L is illustrated in a co-ordinate system having an XZ plane as the plane of integration and having a Y axis extending horizontal and parallel to the plane lamina and perpendicular to the XZ plane. Moreover, the X axis is horizontal and the Z axis is vertical and positive downward.

The intersection of the X, Y and Z axis, commonly called the origin O, is taken as the reference point at which the gravitational effects are to be calculated. Since the attraction of the plane lamina will be detected by a gravity meter only as an increment $\Delta g$ of the total gravity $g$, only the Z or vertical component of the gravitational attraction need be considered and it is this particular value which is computed.

If the horizontal plane lamina is considered to be of infinite length and width and is bounded by the planes $z$ and $z+dz$; if $dS$ is considered to be an increment of area of the plane lamina; and if $\rho$ is considered to be the volume density of an element $dSdz$ so that the total mass $dm$ of this element is $\rho dzdS$ then the vertical component, at the origin O, of the attraction due to this element will be:

$$dg = \frac{kdm}{r^2} \sin \alpha = \frac{k\rho dzdS}{r^2} \sin \alpha \quad (1)$$

$k$ being defined as the constant of gravitation, $r$ being defined as the polar distance of the element from the origin O, and $\alpha$ being defined as the angle of the depression of $r$ from the XY plane. However, since $$\frac{dS \sin \alpha}{r^2} = d\Omega \quad (2)$$

where $d\Omega$ is the solid angle subtended at the origin by the area $dS$, Equation 1 can be written more simply in the form:

$$dg = k\rho dz d\Omega \quad (3)$$

If the finite area S made up of a number of the increments $dS$ is considered to have an arbitrary shape so that the lamina comprises a plurality of elements $dSdz$, then the attraction at the origin O of the mass of the lamina defined by the finite area S is:

$$g = kdz \int_S \rho d\Omega \quad (4)$$

and if $\rho$ is constant over the finite area S, the above equation simplifies to:

$$g = k\rho\Omega dz \quad (5)$$

For a given solid angle $\Omega$, the attraction of the matter enclosed between any two arbitrarily selected horizontal planes $z_1$ and $z_2$ (not shown) would be obtained by integrating Equation 5 with respect to $z$ so that:

$$g = k\Omega \int_{z_1}^{z_2} \rho dz \quad (6)$$

Here again, if $\rho$ is considered to be constant the above equation becomes:

$$g = k\rho\Omega(z_2 - z_1) \quad (7)$$

which is the contribution to gravity at the origin O of the mass contained in a slant cone frustrum bounded by planes $z_1$ and $z_2$ and having its virtual vertex at the origin O.

To develop an expression for the attraction of a two-dimensional distribution mass, the element of surface area $dS$ is considered to become a narrow linear strip of infinite length extending parallel to the Y axis. Such a strip is defined by the area on the plane $z$ lying between the two inclined planes A and B which intersect on the Y axis and form with the X axis angles of $\theta$, and $\theta + d\theta$, respectively, as illustrated in FIG. 4. As indicated in Equation 5 above, the attraction of this strip is proportional to the solid angle subtended by it at the origin O' and as a result, the solid angle $d\Omega$ between two planes intersecting at angle $d\theta$ will bear the same ratio to the total solid angle which the plane angle $d\theta$ bears to the total plane angle. The total solid angle is the ratio of the surface area of a sphere to the square of its radius, or $4\pi$, and the total plane angle is $2\pi$. Thus:

$$\frac{d\Omega}{4\pi} = \frac{d\theta}{2\pi}$$

or:

$$d\Omega = 2d\theta \quad (8)$$

Introducing the above value into Equation 3 yields the following expression for the gravitational attraction of such a strip:

$$dg = 2k\rho d\theta dz \quad (9)$$

which is generally termed the fundamental differential equation of the gravitational attraction of a two-dimensional mass at the origin O'. As illustrated in FIG. 4, the intersection of the two planes A and B with the planes $z$ and $z+dz$ defines an elementary prism of infinite length and, in terms of the variables $\theta$ and $z$, this prism has a cross section $d\theta dz$. This volume may be referred to as the $d\theta dz$-prism.

For a finite area in the plane of integration having a constant $\rho$ bounded by any two planes $z_1$ and $z_2$ and also bounded by two planes forming angles of $\theta_1$ and $\theta_2$ with the X axis:

$$g = 2k \int_{\theta_1}^{\theta_2} \int_{z_1}^{z_2} \rho d\theta dz \quad (10)$$

or:

$$g = 2k\rho(\theta_2 - \theta_1)(z_2 - z_1) \quad (11)$$

which shows that the total force is independent of the absolute magnitude of either $\theta$ or $z$.

The Equations 9 and 11 afford a basis for the computation of the gravitational effects of two-dimensional masses by areal integration of the $\Delta\theta\Delta z$ prisms. Thus, in FIG. 5, an irregular body C of two-dimensional mass is shown superimposed on a network of $\Delta\theta\Delta z$ prisms. The parameters $\theta$ and $z$ are taken as the variable of integration, and the XZ plane, the plane of integration, is divided into a mosaic of $\Delta\theta\Delta z$ prisms by radial lines emanating from the origin O' separated by a constant spacing $\Delta\theta$, and by horizontal lines having constant vertical spacing $\Delta z$.

If the prisms are chosen small enough so that $\rho$ may be considered constant for each prism (see FIG. 5) the gravitational contribution of a single prism can be seen from Equation 9 to be:

$$\Delta g = 2k\rho\Delta\theta\Delta z \quad (12)$$

and the integration over any area will be approximated by:

$$g = 2k \sum_{i=1}^{i=n} \rho_i \Delta\theta\Delta z \quad (13)$$

and if $\rho$ is constant over the whole area of integration, that is, if the mass is homogeneous:

$$g = 2k\rho n \Delta\theta\Delta z \quad (14)$$

where $n$ is the number of prisms within the designated area.

This latter equation provides a simple method of computing the effects of two-dimensional masses so long as the area of integration is finite in extent and not too near the horizon. Like most areal integrations, however, the equation is not accurate when the conditions are not satisfied, but, despite this handicap, the equation and method are still valuable in that they give a simple picture of masses having equal gravitational effects at a reference point despite variations in size and shape, since for the same density the contribution of each prism is the same. FIG. 5 illustrates an irregular body C superimposed on a network of the prisms and indicates the number of increments of gravity attributed to the body C at the point of origin or the reference point O'.

It will thus be appreciated that for a two-dimensional distribution homogeneous mass underlying a reference point, different sized prisms contribute the same increment of gravitational force although each is of different size depending upon its angular position and depth relative to the reference point. Expressed in another way, a given or finite two-dimensional distribution mass contributes more to the gravitational effect at the reference point when it is located vertically below and immediately beneath the reference point than when it is located either off the vertical or at a greater depth relative to the reference point. Referring more specifically to FIG. 5, the finite two-dimensional distribution mass is assumed to have an inch square cross section, and when located adjacent to the reference point O is identified as $v_1$ and when located remotely from the reference point is identified as $v_2$. The $v_1$ volume can be seen to comprise approximately seventeen or eighteen prisms each of which represents an increment of gravity, and the $v_2$ volume comprises between two and three prisms representing an equal number of increments of gravity.

The above discussion is predicated on the two-dimensional distribution mass being of uniform or homogeneous density. However, in gravity explorations it is common to survey a two-dimensional distribution mass having portions of different densities, for example, the subsurface layers or strata in a typical earth structure. In this connection, the gravitational effect of a subsurface stratum is directly proportional to its density or specific gravity with the result that a volume of high density or specific gravity contributes more to the gravitational effect at a reference point than a volume of low density or specific gravity located at the same relative position as the volume of high density. Thus, since there is generally an increase of density with depth, an uplift of deeper formations (i.e., an anticline structure) results in positioning formations of greater density in the same horizontal plane as lighter formations, with the result that the gravitational force field above the apex of the anticline is greater than the field above either inclined portion of the anticline.

Figure 6:
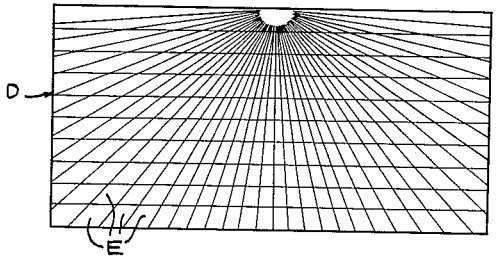
FIG. 6 is a view of a graticule chart which may be used to compute the gravitation effects of structures having two-dimensional distributions.

On the basis of these mathematical analyses above, various graticule charts and the like have been developed for the purpose of determining by the principle of summation the gravitational effects at a designated point of two-dimensional distribution masses. A graticule chart D developed independently by several authorities in the gravitational exploration field is illustrated in FIG. 6 and includes a plurality of sections E corresponding to the previously described $d\theta dz$ prisms, each of which represents an equal increment of the vertical component of the gravitational force field at the reference point O. The sections are all trapezoids formed by the intersection of a plurality of equally spaced, parallel, horizontal lines, with groups of radial lines defining equal angles and emanating from the origin O. If a chart pertaining to a particular homogeneous structure which surrounds an irregularly shaped body is drawn to a scale 1″ to 10,000′ and if the density contrast of the irregularly shaped body is known, e.g., .25, then each section will contribute to the gravitational field at the origin O' .3 milligals, a milligal being a unit of measure of gravity and being equal to .001 centimeters per second per second. Thus the vertical gravitational component for either a single stratum or a buried body outlined on the chart may be readily determined by counting or summing the number of sections enclosed within the boundary of the stratum or body. The graticule chart and similar devices are limited to computing the gravitational effects of two-dimensional distribution masses of homogeneous or uniform density and have no practical application in the case of two dimensional distribution masses having portions of different density and, accordingly, the present invention is concerned with the determination of the force field associated with masses of the latter type.

In accordance with this invention, there is provided an apparatus 20, illustrated schematically in FIG. 1, for producing a simulated profile or geologic cross section of a portion of the earth's subsurface structure, as, for example, the structure illustrated in FIG. 2. The latter structure comprises an earth to air interface identified at 41 and several buried or subsurface interfaces 42a, 42b and 42c bounding the strata 40, 44, 45 and 46, the strata 46 being customarily referred to as the earth's weathering layer. Each stratum is assumed to be homogeneous and to have two-dimensional mass distribution, that is, each stratum is assumed to extend for an infinite distance in a direction extending perpendicular to the plane of the paper as viewed in FIG. 2. To simplify the explanation, the stratum 40 is illustrated as comprising a limestone layer, the stratum 44 is shown as a shale layer, the stratum 45 is depicted as a sandstone layer and the weathering lawer 46, of course, comprises mixtures of sand, clay, moisture and the like. The depths of the interfaces are determined, as indicated above, by seismic exploration in conventional manner, and the composition of the layers which might be expected to be encountered in the survey area can usually be estimated by results of prior surveys in the same vicinity or by logging a borehole in the general area either by taking core samples or by making electrical measurements. Gravitational force field measurements are made at a plurality of spaced points on the earth's surface as, for example, at the points 43a, 43b and 43c illustrated in FIG. 2.

As previously mentioned the apparatus 20 is adapted to provide an indication of the gravitational effects of the sub-surface structures. These structures may be comprised of two-dimensional distribution masses having portions of different densities or, alternatively, the subsurface structures may be of the type shown in FIG. 11 having three-dimensional distribution masses including portions of different densities. The apparatus 20 will be first described as used to analyze two-dimensional distribution masses of the type shown in FIG. 2 and to this end, the apparatus 20 employs a graticule having a plurality of spaced holes or apertures therein for producing a light field corresponding to the gravitational force field for a unit density two-dimensional distribution mass, this light field, for convenience, being hereinafter referred to as the graticule light field. The apparatus employs the principle of optically integrating the light rays or beams from different sections of the graticule after the intensities of these light beams have been modified in accordance with the densities of the different earth layers and bodies in the mass simulated by each section.

Briefly, the apparatus 20 comprises a light source 22 and suitable optical equipment 22a for producing and directing a uniform light field through a gravity graticule 25 in order to create the graticule light field 26 having a distribution corresponding to the gravitational force field for a homogeneous mass. The equipment 22a may include one or more lenses for focusing the light from the source 22 together with appropriate reflectors (not illustrated) for directing the light from the source 22 to the lenses. The graticule light field 26 is transmitted through a transparent window 27 supporting the simulated profile or geologic cross section 21 which further modifies the light field in accordance with the densities or specific gravities of the various formations represented upon the cross section. Thus, the gravity graticule 25 and the geologic cross section 21 cooperate to control the total amount of light transmitted to a light responsive means 29 in such manner that this light is proportional to the vertical component of the gravitational force field at one of the testing stations 43a, 43b or 43c. The light responsive means 29 is included in an electrical circuit 30 which provides a numerical indication of the value of the vertical component of the gravitational force field, which value varies inversely with the quantity of light detected by the light responsive means 29. Hence, instead of manually summing or counting the number of sections on the graticule chart enclosed by a given subsurface body as in prior art arrangements, the apparatus 20 sums optically the number of light rays transmitted through the graticule after these rays have been altered by the geologic cross section to compensate for non-homogeneties in the subsurface body. As indicated hereinafter, the apparatus 20 has the advantage over the graticule chart shown in FIG. 6 and the like in that variations in the density of portions of the subsurface masses can be considered and taken into account in producing the geologic cross section 21.

Considering now in greater detail the apparatus 20, the light source 22 comprises a plurality of lamps either of the tungsten filament or fluorescent type, which are adapted to produce a substantially constant light intensity irrespective of fluctuations in the line voltage supply (not shown). A manually operable on-off switch 38 is provided to complete the circuit from the light source 22 to the line voltage supply. The optical equipment 22a functions to create a light field 23 having uniform intensity or distribution in a plane substantially perpendicular to a reference or center line 31 passing through the gravity graticule 25, the window 27, the geologic cross section 21 and the light responsive means 29.

The gravity graticule 25 is positioned perpendicular to the reference line 31 in the above described plane so that the uniformly distributed light rays impinge upon the surface 25a of the graticule and the optical equipment 22a insures that these light rays extend substantially parallel to each other and perpendicular to the plane of the graticule. One form of graticule 25, illustrated in detail in FIG. 7 and constructed in accordance with the present invention, is five by ten inches in dimension and is representative of a cross sectional area of subsurface formations 5,000 feet deep and 10,000 feet wide. The scale of the graticule is, therefore, one inch to 1,000 feet, both vertically and horizontally, and the graticule may be referred to as a "one to one" graticule. Considering the graticule 25 in greater detail, it comprises a flat plate 33 made of metal or other opaque material which prevents the transmission of light therethrough and, preferably, absorbs the light rays impinging upon the surface 25a, thereby to prevent the reflection of the light rays which might otherwise produce a non-uniform light distribution over the surface 25a. The graticule performs a function somewhat analogous to the graticule chart D illustrated in FIG. 6 and described above in that it divides or distributes the uniform light field 23 to produce a non-uniform field 26 having light rays spaced apart like the sections of the chart D and, to this end, there are defined in the plate 33 a plurality of openings 34 arranged along a plurality of straight lines radially emanating from an apex 35. The latter point corresponds to the location of one of the gravity testing stations, for example, the station 43a, on the earth's surface. As indicated above, the openings 34 are so spaced and arranged that each opening is representative of a section of the graticule chart D illustrated in FIG. 6 and is, therefore, representative of an increment of gravity. Thus, the openings 34 along each radial line from the apex 35 are equally spaced apart, but the distance between openings on adjacent lines successively increases as the lines deviate from the vertical. These openings correspond substantially with the centers of the trapezoid sections of the graticule chart illustrated in FIG. 6. In addition, like the sections of the latter graticule chart, a great number of the openings 34 are located vertically below and immediately adjacent to the apex 35 so that the graticule light field 26 is more intense in the vicinity of the apex 35.

The window 27 comprises a frame 27b made of opaque material, which frame 27b surrounds and supports a glass or transparent plastic plate 27c. The plate 27c permits the transmission of the light field 26 therethrough and is substantially the same size as the gravity graticule 25, i.e., five inches by ten inches. Suitable fastening means (not shown) are provided to support the geologic cross section 21 on the window so that a portion or section of the cross section intercepts the light field 26. The cross section 21 may then be manually moved from bottom to top as viewed in FIG. 1 into different preselected positions across the window 27 successively to bring adjacent sections into positions intercepting the light field 26. To provide means for aligning the graticule 25 with the window 27, a suitable reference point 27a is marked on the window at the point where the projection of the apex 35 intersects the window. Thus, the graticule light field 26 may be properly oriented relative to the window by aligning the projection of the apex 35 of the gravity graticule 25 with the reference point 27a after which the first section of the geologic cross section 21 may be positioned on the window with a point 143a aligned with reference point 27a in the manner shown in FIG. 1.

Figure 8:
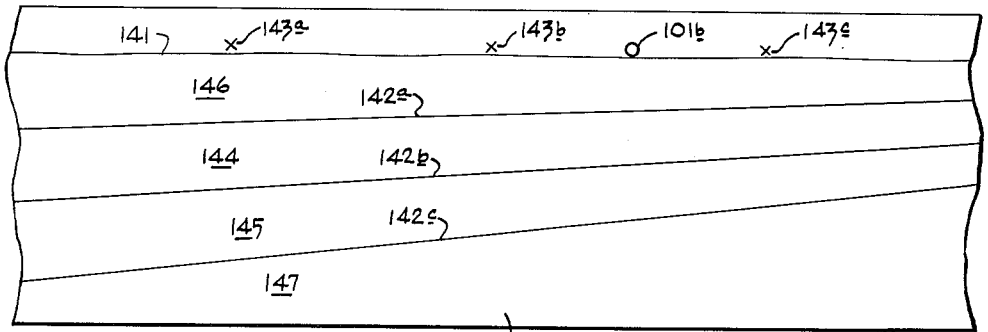
FIG. 8 is an enlarged, fragmentary top plan view showing the surface of a portion of the vertical geologic cross section used with one application of the apparatus shown in FIG. 1.

Considering more specifically the geologic cross section 21, a portion of which is illustrated in detail in FIG. 8, it may comprise a rectangular sheet of transparent medium 139, e.g., which has a width substantially equal to the width of the plate 27c in the window 27 and a length of several times the length of the window plate.

It should be appreciated also that the cross section 21 may be made from a material having reflective rather than transmissive characteristics, which material may be shaded or altered to vary the amount of light reflected from the cross section 21. In the latter case the light developed by the graticule is not transmitted through the cross section, but is instead reflected from the cross section. The reflected light, of course, is detected by the light responsive means in the manner set forth below. However, regardless of the material used above, a nonuniform density altered light field is produced by the cross section.

Assuming that a transparent medium is used, this medium has accurately scaled thereon either subsurface interfaces or boundary lines of an irregularly shaped subsurface body. As indicated above, the shape or contour of the interfaces may be determined by seismic prospecting of the subsurface strata under investigation. As shown in FIGS. 1 and 8, lines corresponding to the various interfaces of the subsurface structure, for example, the structure shown in FIG. 2, are then drawn on the cross section 21 by use of a pencil or other marking device. Thus, the line 141 represents the surface line 41 of the earth structure shown in FIG. 2, the lines 142a, 142b and 142c represent the interfaces 42a, 42b and 42c, respectively, points 143a, 143b and 143c represent the gravity measuring stations 43a, 43b and 43c and the regions 140, 144, 145 and 146 of the cross section 21 respectively represent the subsurface strata 40, 44, 45 and 46. The lines of the cross section 21 are, of course, spaced apart to correspond to the depths of the interfaces as determined from the seismic survey or other information and the contours of the cross section lines correspond to the configurations of the interfaces which they represent. Preferably, the cross section 21 is drawn to the same scale both vertically and horizontally, for example, 1″ equal to 1,000′. As shown, the interface lines are inclined and generally converge from the lower left to the upper right of the cross section 21 to conform to the earth structure shown in FIG. 2. The medium 139, in addition to permitting the transmission of the graticule light field 26 therethrough, is adapted to have its optical density or transmissibility altered, i.e., the amount of the light field passed through the medium may be changed. To this end, the medium 139 is made of a composition which may be readily shaded by a pencil or the like, whereby the passage of the light rays is partially or totally obstructed to a degree which is dependent upon the amount of the shading by the pencil. The distribution of the non-uniform graticule light field 26 is modified in accordance with the location of the medium 139 on the window and with the degree of shading thereon, with the result that the light transmitted through the cross section 21 comprises a second nonuniform, density altered light field 28.

More specifically, after the surface lines 141 and the interface lines have been drawn on the medium 139, the portions 140, 144, 145 and 146 of the medium disposed between respective adjacent pairs of the interface lines, corresponding to the simulated formations or strata, are shaded to alter the light transmissibility quality of each portion, thereby to produce an optical transmissibility or density proportional to the specific gravity of the corresponding subsurface stratum. For example, as illustrated, the portion 144 of the medium 139 located between the interface lines 142a and 142b represents a shale layer which is relatively dense and, accordingly this portion is shaded very dark. On the other hand, the portion 145 of the medium 139 located between the interface lines 142b and 142c represents a sandstone layer which is relatively less dense than shale so that the portion 145 is shaded to a lesser degree than the portion 144. The weathering layer portion 146 located between the surface line 141 and the interface line 142a and comprising a mixture of sand, clay, moisture, etc., has a relatively low density and, hence, this portion is shaded only slightly as compared to the portion 144. The actual method of determining the proper shading of the various portions is described hereinafter in greater detail. Because of the non-uniform field 26 developed by the gravity graticule 25 and falling upon the window 27, when the cross section 21 has one of its simulated stations, for example, station 143a, aligned with reference point 27a of the window, that segment of the medium located immediately beneath the simulated station affects the light field much more than any other segment of equal size on the medium. This is true because of the fact that the light field 26 is concentrated or more intense in the vicinity of reference point 27a. As a consequence, the shading of the segment immediately beneath the simulated station is quite critical to the amount of light reaching the light responsive device 29 since it controls substantially half of the light transmitted through the medium 139. More specifically, assuming that the cross section 21 representing the earth structure shown in FIG. 2 is positioned on the window 27 and the simulated station 143a is superimposed upon the point 27a, a substantial quantity of light passes through the cross section to the light responsive means 29 since the weathering layer portion 146 is not dense and is only shaded slightly. The reading of the measuring circuit 30, which, as previously mentioned, provides a measurement or indication in gravitational force field units of the portion of the cross section 21 on the window 27, would be relatively low, this reading being hereinafter referred to as the simulated gravitational force field value. If the cross section 21 is moved upward as viewed in FIG. 1 until the simulated station 143b is superimposed on the point 27a, a decreased quantity of light passes through the cross section since the more dense shale portion 144 is effectively moved toward the right and nearer to the reference point 27a. Accordingly, the simulated gravitational force field reading provided by the measuring circuit 30 increases slightly to indicate an increased gravitational force field. Furthermore, when the cross section 21 is further moved upward and the simulated station 143c is superimposed on the point 27a, a lesser quantity of light passes through the cross section since a greater part of the dense shale portion 144 is effectively moved closer to the reference point 27a. Again, the simulated gravitational force field reading of the measuring circuit 30 is further increased to reflect the greater contribution of the dense shale portion to the gravitational force field. Hence, the denser the stratum formation portion and the closer that portion is located adjacent to the reference point 27a, the less light is transmitted through the cross section 21 to the light responsive means 29 and the higher the reading of the circuit 30. Conversely, as the density of the stratum portion decreases and as this portion effectively moves further away from the reference point 27a, the light transmitted through the cross section 21 to the light responsive means 29 is increased and the reading of the circuit 30 is correspondingly decreased.

As indicated above, the density altered light field 28 transmitted through the geologic cross section 21 is directed by suitable optical reflecting apparatus 22b upon the light responsive means 29. The means 29 may comprise any of the well known photocells, but preferably comprises either a photoemissive cell or a photovoltaic cell. In a device constructed in accordance with the principles of the present invention, a photovoltaic cell 29a is used to develop a current which is directly proportional to the amount of light falling on the cell. Specifically, if the section of the cross section 21 superimposed on the window 27 has a high optical density and, hence, a low transmissibility, the total light falling upon the cell is low and, accordingly, the current produced by the light responsive means 29 is relatively low. Conversely, if the section of the cross section 25 on the window 27 has a low optical density and a high transmissibility, the total light impinging on the cell is high and, accordingly, the current produced by the light responsive means 29 is relatively high. The current developed by the light responsive means 29 is used in the electric circuit 30 to provide a reading or indication in milligals of the simulated value of the gravitational force field for the particular section of the cross section 21 which is aligned with the window 27.

Referring now to the electrical circuit 30 in detail, it functions as a type of balancing circuit for comparing a voltage representative of the light field 28 with a second voltage representative of a standard light field developed by the light source 22, such that, when the circuit is balanced in the manner described hereinafter, a simulated gravitational force field indication is obtained. More specifically, a second light responsive means 50 including a photovoltaic cell 50a is employed to develop a substantially constant voltage in response to the light transmitted directly from the light source 22 through an aperture 51 of predetermined size in an opaque plate 52. The voltage output of the light responsive means 50 is developed across a load resistor 55 and is used as a reference voltage for comparison with the output voltage of the light responsive means 29 which is developed across a load resistor 57. Actually, the voltage appearing across resistor 55 is applied across a potentiometer 53 and a variable resistor 51 connected in series. The potentiometer 53 has a wiper 53a positioned for movement over a plurality of adjacent scales 54, 54a and 54b with the scale 54 being calibrated directly in gravitational units or milligals, the scale 54a being calibrated in units of specific gravity and the scale 54b being calibrated in terms of microseconds. The voltage appearing between the wiper 53a and one end 53c of the potentiometer 53, that is, the voltage developed across the portion of the winding indicated at 53b, is adjustable and is used to balance or offset the voltage appearing across resistor 57. A null detector 58 is used to determine when the circuit 30 is balanced, that is, to indicate when the voltage across winding 53b is equal to the voltage developed across resistor 57.

In view of the foregoing description, it will be observed that the output voltage of the light responsive means 50 appears across a parallel network comprising, in one leg thereof, the load resistor 55 and, in the other leg thereof, the potentiometer 53 connected in series with a variable resistor 56 which is used to "zero" the null detector 58. The resistor 55 is much smaller than the total resistance of potentiometer 53 and variable resistor 56 so that the total impedance presented to the current developed by the cell 50a is substantially identical to the resistance of resistor 55 and is, for practical purposes, independent of variations in the variable resistor 56. Accordingly, a substantially constant voltage appears across the resistor 55.

As indicated above, a circuit including, first, the null detector 58 connected in shunt with a resistance 59 and also in shunt with a null detector shorting switch 60, and, second, a variable resistor 61 for adjusting the sensitivity of the null detector 58, is connected between the variable tap 53a and one of the output terminals 57a of the light responsive means 29. The resistor 57 is much smaller than the minimum effective resistance of the circuit in parallel therewith, whereby the total impedance presented to the current developed by the cell 29a is substantially identical to the resistance of the resistor 57 and is independent of variations in both the variable resistor 61 and the winding 53b. Whenever the voltages appearing across the winding 53b and the resistor 57 are not equal, current flows through the null detector to deflect its indicating needle 58a. The wiper 53a may be adjusted to alter the voltage appearing between tap 53a and terminal 53c, thereby to balance the voltages applied across the null detecting circuit with the result that no current flows through the null detector and the needle 58a is returned to its zero or null indicating position. Thus, the potentiometer 53 is the means by which the circuit 30 is balanced and also the means by which the simulated gravitational force field indication is obtained. The sensitivity of the null detector 58 is adjusted by altering the variable resistor 61 in order to control the amount of current flowing through the null detector as a result of a given or definite unbalance between the voltages respectively appearing across winding 53b and the resistor 57. Hence, when the variable resistor 61 is set to its maximum value, a relatively low current is passed to the null detector 58, whereby the indicator needle 58a is deflected only slightly in response to the given unbalance and, conversely, when the resistor 61 is set to a low value, the current flowing to the null detector 58 is high so that the indicator needle 58a is deflected by a great amount in response to the same unbalance. Therefore, in balancing the circuit 30, the value of the resistance of the variable resistor 61 is initially set to a relatively high value in order to avoid overdrive of the null detector by a large unbalance, and as the unbalance is reduced by adjustment of wiper 53a, the variable resistor 61 is decreased to increase the sensitivity and provide an accurate null indication. In addition, the variable resistor 56 may be adjusted to alter the voltage appearing across the potentiometer 53 and, hence, across the winding 53b. Thus, variable resistor 56 functions as a "zeroing" control to move needle 58a to the zero position without adjusting the position of the wiper 53a.

Is order to prevent damage to the null detector 58 when the apparatus 20 is shut down, the switch 60 is adapted to be closed to provide a direct short across the null detector. This switch 60 is mechanically connected to or ganged with the on-off switch 38 which controls the energization of the light source 22. Thus, when the switch 38 is in its closed position, the switch 60 is in its open position, thereby permitting normal operation of the null detector 58, and, conversely, when the switch 38 is opened, the switch 60 is closed to short out the null detector 58 whenever the light source 22 is not illuminated.

To operate the apparatus 20 described above, the surface line, interface lines and the simulated testing stations are first drawn on the transparent geologic cross section 21 in the manner indicated above. The optical transmissibility of each of the simulated portions of the cross section 21, that is, the degree of shading of each portion, must then be correlated with the specific gravity of the subsurface layer which it represents and, to this end, one of two procedures may be followed.

The first such procedure is accomplished by using the apparatus 20 as a densitometer whereby unit areas on the cross section are compared directly against transmissibility of the transparent medium 21. If it is assumed that none of the subsurface structures has a density less than two grams per cubic centimeter or a specific gravity less than two, then the transparent geologic cross section 21 is arbitrarily given an optical density of 2.00, which is used as a so-called reference density for comparison with the optical densities of the simulated stratum portions. A filter is substituted for the optical gravity graticule 25 and this filter passes to the window 27 approximately one-sixth of the total light transmitted from the light source 22. A film made from the same material as the geologic cross section 21 is then superimposed upon the window 27. The potentiometer wiper 53a is set to the minimum assumed specific gravity of 2.00, that is, the tap 53a overlies the 2.00 indication on the scale 54a which is calibrated in specific gravity, and after the potentiometer 53 is set, the null detector 58 is "zeroed" by adjustment of the variable resistor 56. Next, the potentiometer wiper 53a is manually set to a value corresponding to the specific gravity of one of the tested subsurface stratum and an accurately outlined area located substantially centrally of the cross section 21, for example, an area of one square inch, is shaded until the needle 58a is returned to its zero position. The shaded area then has an optical density corresponding to the specific gravity of the tested stratum. The film is then removed from the window 27 and is replaced by another film. The wiper 53a is then manually set to another value corresponding to the specific gravity of a second of the subsurface strata and another one square inch outlined area is shaded until the needle 58a is returned to its zero position. This area then has an optical density corresponding to the specific gravity of the second stratum. The process is repeated to obtain films having a shaded area corresponding to the optical density of each of the remaining subsurface strata. Once the optical density is obtained for each of the test subsurface strata, the balance of each subsurface stratum portion on the cross section 21 is shaded by visual inspection or comparison with the corresponding outlined areas on the different films. The films produced thus serve as references from which the geologic cross section may be shaded. After a complete set of reference films has been obtained, the above described procedure, of course, need not be repeated each time the apparatus 20 is used.

The second procedure for correlating the shading of the cross section and the specific gravity of the subsurface strata is to prepare a mosaic of transparent mediums having different optical densities or transmissibilities corresponding to the size and the specific gravity of each of the subsurface stratum. As indicated above, the optical gravity graticule, being five by ten inches in dimension and being drawn to a scale of one inch to 1,000 feet, both vertically and horizontally, permits an area of subsurface formations 5,000 feet thick and 10,000 feet wide to be analyzed at one time. By mathematical computation, not set forth herein, the vertical component of the gravitational force field for a homogeneous mass, 5,000 feet thick and of infinite width and having a specific gravity of 2.00 grams per cubic centimeter can be shown to be 127.70 milligals. In order to determine the vertical component of the gravitational force field for that portion of the infinite lateral mass superimposed on the window 27 (i.e., the mass 5,000 feet thick and 10,000 feet wide) two corrections must be applied to the computed value of 127.70 milligals. The first correction is to compensate for the so-called "edge effect" which results from the fact that additional formations which lie beyond the side boundaries of the 5,000' by 10,000' mass contribute to the 127.70 milligal value. The second correction is to compensate for what may be termed a "blind spot" which exists in the vicinity of the apex 35 of the optical gravity graticule.

Figure 9:
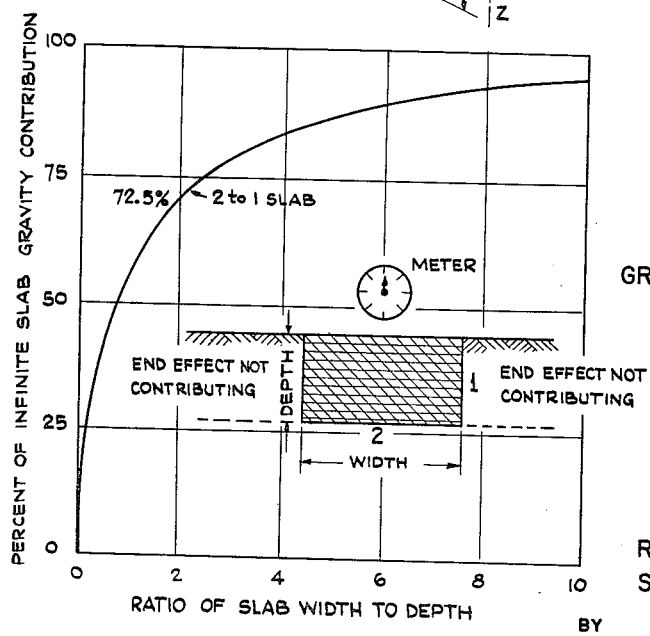
FIG. 9 is an illustration of a gravity correction curve used in conjunction with the apparatus of the present invention.

Considering first the edge effect, a gravity correction graph of the type illustrated in FIG. 9 and indicating the relative percentage of the total gravity contributed by a rectangle of finite width as compared to a rectangle having an infinite width may be used to obtain a correction factor to be applied to the 127.70 milligal computed value. The abscissas of this graph represent "ratio of slab width to depth" while the ordinates represent "percentage of infinite slab gravity contribution." Hence, with a given ratio slab width to depth, for example, if the effective area of the cross section under examination is 5,000 feet thick by 10,000 feet wide, the ratio is equal to two and the percentage of infinite slab contribution, by reference to the gravity correction curve, is equal to 72.5 percent. Therefore, the formations beyond the edges of the finite rectangle contribute 27.5 percent to the vertical component of the gravitational field force of a mass having an infinite width. Accordingly, the value of 127.70 milligals computed for the mass having a 5,000 foot thickness and an infinite width must be modified by multiplying the 127.70 milligals by .725 (72.5 percent) or 92.58 milligals.

Figure 7:
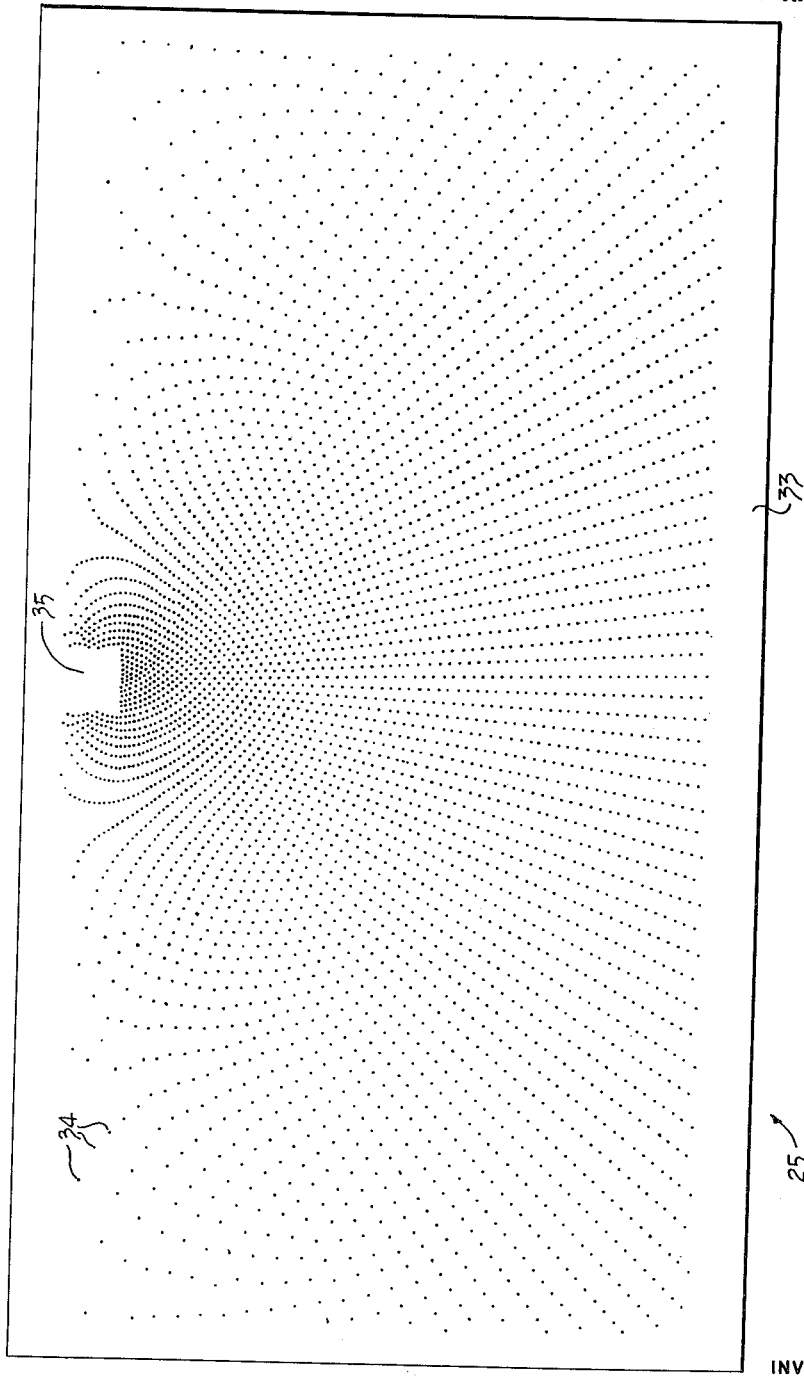
FIG. 7 is an enlarged view of the surface of a vertical gravity graticule used in the apparatus shown in FIG. 1.

This value of 92.58 milligals considered as the vertical component of the gravitational force field for a mass of 5,000 foot thickness and 10,000 foot width must again be corrected to compensate for the blind spot existing near the apex of the optical gravity graticule. More specifically, and as illustrated in FIG. 7, there exists a small unused area immediately beneath and adjacent to the apex 35 of the optical gravity graticule. Clearly, since no light passes through this area, it contributes nothing to the simulated gravitational reading and is, accordingly, referred to as the blind spot. Unfortunately, this area cannot be eliminated entirely from the optical gravity graticule because the openings converging toward the apex of the graticule, if extended to the apex, would produce an enlarged aperture permitting passage of an excessive amount of light, which would be so concentrated that it would be virtually impossible effectively to control the remainder of the field by shading of the cross section. It has been found that the proportion of gravitational force field neglected by the blind spot is the ratio of the size of the blind spot to the size of the entire optical gravity graticule. In an optical gravity graticule made in accordance with the present invention, this blind spot correction was determined to be five percent of the light field developed by the optical gravity graticule. Thus, five percent of 92.58 milligals is 4.63 milligals and the total gravitational force field attributed to the mass of 5,000 feet thick by 10,000 feet wide is equal to 92.58 milligals minus 4.63 milligals or 87.95 milligals.

The contribution of the edge effect or the blind spot may, if desired, be reduced. More specifically, the effect of the edge effect may be lessened by (1) using side filters which duplicate the gravity effect of the formations existing beyond the edge or (2) using a distorted vertical to horizontal scale. For example, with the use of a five to one distortion, the edge effect is reduced to six percent of the total contribution of an infinite slab or mass. Additionally, the exaggerated vertical scale optical gravity graticules are useful for computing terrain or topographic effect. Thus, while in the foregoing description a one to one graticule has been considered, it should be understood that graticules have a vertical scale to horizontal scale of as much as ten to one or even greater can be used. Moreover, while the one to one graticules are generally of rectangular shape, the exaggerated vertical scale graticules may be square shaped. The effect of the blind spot can be reduced by enlarging the relative area of the geologic cross section and maintaining the area of the blind spot constant.

The above computation of 87.95 milligals is, as indicated above, the value of the vertical component of the gravitational force field produced by a homogeneous mass or slab 5,000 feet thick and 10,000 feet wide which has a minimum reference density of 2.00 grams per cubic centimeter. Another film having the same optical transmissibility as the cross section medium 139 is placed on the window 27 to simulate the above homogeneous mass having the reference specific gravity and the measuring circuit is balanced. To establish a reference shading for the slab at the chosen graticule scale with the last-mentioned film on the findow 27. The potentiometer wiper 53a is adjusted until it coacts with the scale 54 to indicate the balanced value plus the 87.95 milligals computed for the slab. The cross section is then shaded until a balanced condition is obtained, thereby providing a standard shading for the density contrast of the slab at the chosen scale.

Alternatively, the wiper 53a may be initially set to a reading of 87.95 milligals on scale 54. The null detector is then "zeroed" by adjustment of the variable resistor 56 until the voltages respectively appearing across the resistor 57 and across the winding 53b are equal or balanced. The geologic cross section 21 having the strata portions 140, 144, 145 and 146 shaded so that they are intended to correspond to the specific gravities of the respective subsurface strata which they represent, is superimposed on the window 27 and the simulated testing station 143a corresponding to the first testing station 43a is aligned with the reference point 27a on the window. The geologic cross section 21 modifies the graticule light field 26 to reduce the quantity of light impinging on light responsive means 29, with the result that the voltages existing across the winding 53b and the resistor 57 are unbalanced and the null detector needle 58a is deflected. By moving the potentiometer wiper 53a, the voltage differential is reduced to zero and the null detector needle 58a is returned to zero or null condition. The simulated component of the gravitational field force of that section of the cross section 21 located over the plate 27c of the window 27 is determined by reference to the position of the wiper 53a on the scale 54. Since the scale is calibrated in milligals, the gravitational value may be read directly. The simulated gravity value is compared with the gravity value measured at the first testing station 43a during the survey. If the simulated and measured values are identical, then that section of the geologic cross section 21 on the window 27 accurately represents the corresponding part of the profile of the earth formations. Next, the cross section 21 is moved over the window 27 until the simulated testing station 143b is aligned with the reference point 27a so that a second section of the cross section 21 covers the window plate 27c. The first and second sections may actually overlap slightly in order to obtain continuity. The quantity of light falling on the light responsive means 29 is altered and in the case of the cross section 21 shown in FIG. 1, this light is reduced. Accordingly, the voltage across the resistor 57 is decreased and the null detector needle 58a is deflected. The null detector needle is again returned to its zero position by adjustment of the wiper 53a and the simulated gravity value existing at the simulated testing station 143b is obtained by reference to the wiper 53a and scale 54. The geologic cross section 21 is moved into successive positions with the remaining simulated testing stations superimposed in order on the reference point 27a and the above described procedure repeated so that a simulated gravity value is obtained for each simulated testing station.

In the event that the measured and simulated gravity values do not agree, one of the sections of the geologic cross section 21 may be easily modified by altering the optical transmissibility of certain or all of the portions 140, 144, 145 or 146 by erasing and reshading to obtain a simulated gravity value which is more nearly equal to the measured value. The erasing and reshading is continued by a trial and error procedure until the simulated gravity value and the measured gravity value coincide for each section of the geologic cross section.

It will be appreciated that regardless of the configuration, complexity and the specific gravity of the strata in the subsurface formations, the apparatus 20 enables changes in optical transmissibility or density to be made on the geologic cross section and an evaluation of the changes to be performed relatively quickly. There is no limitation on the complexity of the cross section to be examined nor in the changes that can be introduced. For example, in examining a fault problem by sketch modifications, the orientation, the dimensions and the specific gravity of the formations can be varied at will. In addition, an entire simulated stratum portion may be quickly and easily added to or deleted from the geologic cross section.

Figure 11:
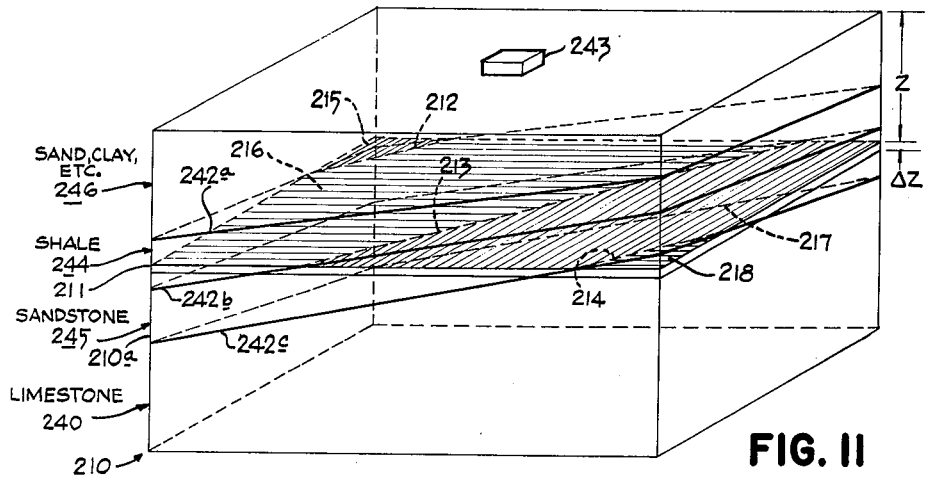
FIG. 11 is an oblique projection of a typical subsurface structure having three-dimensional mass distribution cut by a horizontal layer.

The discussion hereinabove has been directed to the use of the apparatus 20 in analyzing two-dimensional distribution masses, such as faults, synclines, anticlines and other geologic formations whose widths are greater than their depths and whose lateral dimension may be considered to be substantially infinite. However, it should be pointed out that the apparatus 20 may also be used with three-dimensional distribution masses with the essential difference being that instead of a single vertical section being taken as a basis for mathematical computation, a plurality of horizontal sections are used. More specifically, the total gravitational effect of a subsurface formation having three-dimensional mass distribution as illustrated in FIG. 11 is the sum of a large number of imaginary individual horizontal layers which make up the subsurface formation. The apparatus 20 can be used to compute or determine the simulated gravitational effect of each of these individual layers after which it is a relatively simple matter to sum the simulated gravity value of each such layer to obtain the total gravitational effect of the formation. The thinner each layer is made, the larger the number of layers that may be used and the more accurate is the simulated gravitational value.

Figure 10:
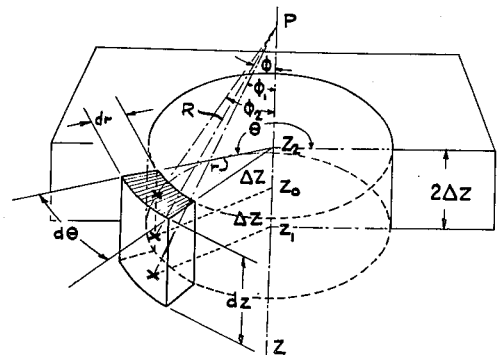
FIG. 10 is a perspective view illustrating a geometric figure useful in explaining and computing the gravitational effect of a structure having three-dimensional mass distribution.

Considering first the underlying theory for analyzing the gravitational effect of a single horizontal layer of the subsurface formation, FIG. 10 illustrates a three-dimensional geometric figure showing particularly the gravitational contribution of a small unit volume $dv$, which is equal to $rd\theta dr dz$ and is contained within the layer. The gravitational contribution $dg$ of this unit volume at a reference point P, for example, a point at the earth's surface may be expressed as follows:

$$dg = \rho \frac{dv}{R^2} \quad (15)$$

where $\rho$ is the density of the unit volume. The vertical component $dg_v$ of this gravitational contribution is thus:

$$dg_v = \rho \frac{dv}{R^2} \cos \phi = \frac{\rho r d\theta dr dz}{R^2} \cos \phi \quad (16)$$

Integrating to obtain the contribution of the volume bounded by horizontal planes $z_1$ and $z_2$ of the layer yields:

$$dg_v = \int_{z_1}^{z_2} \frac{\rho r d\theta dr}{R^2} \cos \phi dz = \int_{z_1}^{z_2} \frac{\rho r d\theta dr}{(z^2 + r^2)} \cdot \frac{z}{(z^2 + r^2)^{1/2}} dz \quad (17)$$

Assuming that $\rho$, $rd\theta$ and $dr$ remain constant for the unit olume, then Equation 17 may be integrated as follows:

$$dg_v = \frac{\rho r d\theta dr}{2} \int_{z_1}^{z_2} \frac{2z\,dz}{(z^2+r^2)^{3/2}} = \left[\frac{-2}{(z^2+r^2)^{1/2}}\right]_{z_1}^{z_2} \cdot \frac{\rho r d\theta dr}{2}$$ (18)

Substituting the integration limits gives:

$$dg_v = \rho d\theta dr\left[\frac{r}{(z_2^2+r^2)^{1/2}} - \frac{r}{(z_1^2+r^2)^{1/2}}\right]$$
$$= \rho d\theta dr[\sin\phi_2 - \sin\phi_1]$$ (19)

The final Equation 19 is a mathematical expression for an increment of gravitational force field attributed to the unit volume $rd\theta dr dz$ in a horizontal layer as contrasted with Equation 14 which provides an expression for the gravitational effect of an entire vertical cross sectional area of two-dimensional distribution masses. The Equation 19 is accurate for all depths or positions of Z only in the event that two conditions are maintained, i.e., that $$\frac{\Delta z}{z}$$

and $$\frac{r_{max.}}{z}$$

respectively, remain constant. More specifically, the first condition requires that the thickness of each layer be increased as the depth of the layer increases and the second condition requires that the scale of the horizontal layer, represented by a geologic cross section, be changed in accordance with the depth. The first condition arises, of course, because a layer of given thickness near the earth's surface contributes more to the gravitational force field at a point on the surface than a deeper layer of the same thickness. Thus, by taking thicker layers at increased depths the increment of gravitational force field attributed to each layer is the same. The second condition arises because a unit volume of formation lying vertically beneath the reference point contributes more to the gravitational force field at the reference point than a unit volume which is displaced from the vertical.

Figure 12:
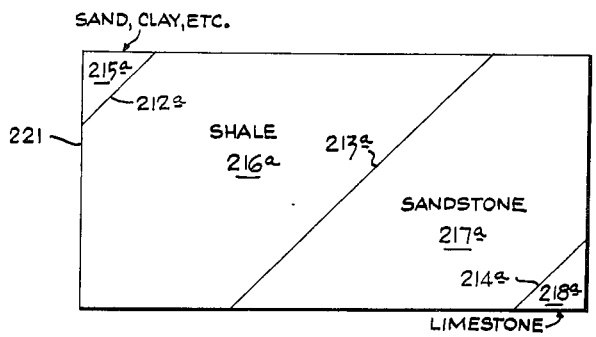
FIG. 12 is a top plan view of a horizontal geologic cross section used in the apparatus shown in FIG. 1 and representing the horizontal layer shown in FIG. 11.

As indicated above, a horizontal layer cut through the subsurface formation may be represented by a geologic cross section in a manner similar to the representation of the vertical profile of the subsurface formation by the geologic cross section. In this connection, the above described second condition may be satisfied either by using geologic cross sections of different scales to represent the different horizontal layers at different depths or by using different optical gravity graticules to develop light fields having different distributions respectively representing the gravitational contribution of homogeneous masses at the different horizontal layers. It has been found that the use of different gravity graticules is preferred because the operation of the apparatus 20 is somewhat simpler by interchanging graticules as compared with the use of different scaled cross sections. Moreover, as previously mentioned, the first condition described above is satisfied by considering each geologic cross section to represent a layer of different thickness, i.e., for layers at increased depth the corresponding cross sections represent a layer of increased thickness. Thus, in order to use the apparatus 20 to determine the gravity effects of three-dimensional distribution masses, a subsurface formation, for example, the formation 210 illustrated in FIG. 11, is considered to be comprised of a plurality of horizontal layers, each of which has a thickness proportional to its depth. A set of cross sections, one of which is illustrated in FIG. 12 and is identified as 221, is used with the apparatus to achieve a layer-by-layer analysis of the gravitational force field contribution of the subsurface formation 210.

Figure 13:
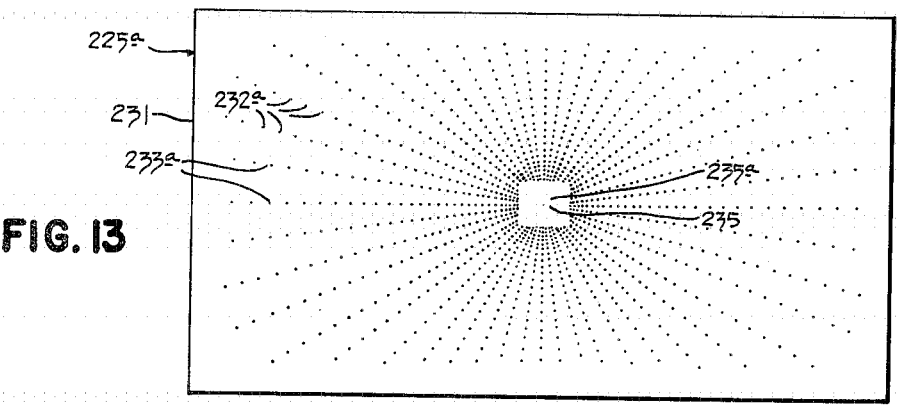
FIGS. 13 and 14 are top plan views of two horizontal gravity graticules used in the apparatus shown in FIG. 1.
Figure 14:
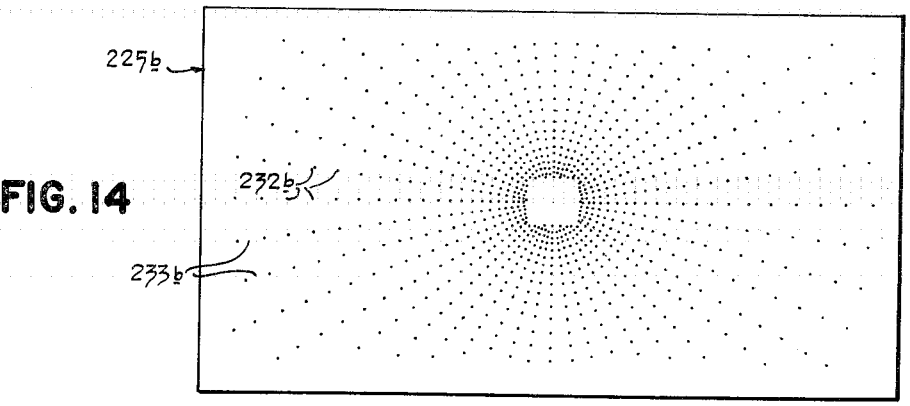

To provide a light field proportional to the gravitational force field of a homogeneous mass assumed to exist at each of the horizontal layers, a set of optical gravity graticules 225, two of which are respectively illustrated in FIGS. 13 and 14 are employed. A particular geologic cross section representing a horizontal layer and a particular graticule corresponding to the gravitational force field of that same layer are supplied to the apparatus 20 to obtain a simulated gravity value for the layer. This process is repeated for each layer by using different cross sections and different graticules, whereupon the simulated gravity value for the entire subsurface formation is obtained by summing or adding the simulated values for each layer.

Each of the gravity graticules contains a plurality of apertures which transform a uniform light field into one having a distribution corresponding to the gravitational force field attributed to a layer comprising a plurality of $rd\theta dr dz$ unit volumes. By shading the geologic cross section associated with each graticule in accordance with the specific gravities of the various portions of the subsurface layer under consideration, the light field created by the graticule may be altered or modified. As described above, the apparatus 20 optically integrates the total light passing through the cross section, i.e., all of the light passing through each of the unit volumes, to provide a simulated gravity reading for each layer of the subsurface formation.

The use of the apparatus 20 for analysis of three-dimensional distribution masses may be best understood by describing the procedure followed in determining the gravity effect of a single layer in a subsurface formation. More specifically, there is illustrated in FIG. 11 the subsurface formation 210 having a three-dimensional mass distribution, which formation has a vertical cross section 210a generally similar to the subsurface formations illustrated in FIG. 2. However, the formation 210, instead of having infinite lateral dimension perpendicular to the vertical cross section 210a, has a finite lateral dimension because of the relatively inclined orientation of the subsurface strata comprising a stratum of shale 244, one of sandstone 245, a limestone stratum 240 and a weathering layer 246. A testing station 243 at which a gravitational force field measurement is made is illustrated as being located on the earth's surface near the center of the upper surface of the formation 210.

If a typical horizontal layer 211 is assumed to be cut through the subsurface formation 210 at a particular depth, it will have a thickness $\Delta z$ to satisfy the above described first condition $$\frac{\Delta z}{z}$$

Since the subsurface strata are generally inclined, the horizontal layer 211 intersects each stratum as best illustrated in FIG. 11. More particularly, the horizontal layer intersects an interface 242a, which defines the boundary plane between the weathering layer 246 and the shale stratum 244, in a straight line indicated at 212. It also intersects interface 242b between the shale stratum 244 and the sandstone stratum 245 in a straight line indicated as 215, and furthermore intersects an interface 242c between the sandstone and limestone strata 245 and 247 in a straight line indicated at 214. Thus, the horizontal layer has a small finite depth and actually cuts through a section of sand, clay, etc., 215, a section of shale 216, a section of sandstone 217 and a section of limestone 218.

The horizontal layer 211 may be represented, as illustrated in FIG. 12, by a cross section 221 on which are depicted portions of the subsurface formation 211. As previously mentioned, when different graticules are employed for the different layers in order to satisfy the second condition described above, the different cross sections may have the same scale. Thus, the scale of the cross section 221 may be similar to the scale of the cross section 21 previously described, i.e., 1 inch equals 1,000 feet. If the formation 210 and thus the horizontal layer 211 is 10,000 feet long and 5,000 feet wide, then the cross section 221 has a ten inch length and a five inch width. The cross section is adapted to be supported upon the window 27 with a simulated testing station 243a located at its center in alignment with a centrally disposed reference point (not shown) on the window. It will be appreciated, however, that the geologic cross section may have a length of more than 10", for example 30", so that a subsurface formation of 30,000 feet in length by 5,000 feet in width may be represented by the cross section. In the latter case, three adjacent sections of the formations may be successively analyzed by simply aligning each simulated testing station on the cross section with the centered reference point on the window 27. In any event, as shown, the cross section 221 represents only the 5,000 feet by 10,000 feet subsurface formation illustrated in FIG. 11 and only one simulated station 243a corresponding to station 243 is shown thereon.

The intersections of the horizontal layer 211 with the subsurface interfaces 242a, 242b, 242c, identified in FIG. 11 as 212, 213, 214, may be drawn by a pencil or the like as intersection lines 212a, 213a and 214a on the cross section 221. Therefore, the area of the cross section 221 bounded by the intersection line 212a and the edge line 221a of the cross section 221, identified by 215a, represents the sand, clay, etc., section 215. Similarly, the area 216a between the intersection lines 212a and 213a represents the shale section 216, the area 217a between the lines 213a and 214a represents the sandstone section 217a, and the area 218a between the line 214a and the edge line 221a represents the limestone section 218.

In order to modify the cross section 221 in accordance with the specific gravity of each of the portions 215, 216, 217 and 218 existing in the horizontal layer 211, the portions 215a, 216a, 217a and 218a are pencil shaded in varying degrees, thereby to alter the optical density or transmissibility of the cross section 221. Once the cross section 221 has been shaded, in a manner similar to the procedure followed in connection with the first embodiment of the invention, it is placed on the window 27 to modify the light field developed by that optical gravity graticule which corresponds to the layer 211 disposed at depth z.

As previously indicated, at the particular depth z a slab of formation having a thickness $\Delta z$ and a homogeneous density mass would produce a particular gravitational force field and a gravity graticule is selected to produce a light intensity field corresponding to this gravitational force field. For example, the graticule 225a shown in FIG. 13 provides a light intensity field for a homogeneous density mass existing at the particular depth z and is therefore employed in conjunction with the cross section 221. More specifically, the graticule 225a comprises a sheet of opaque material through which are defined a plurality of spaced apart openings 232a for passing light rays emanating from the light source 22. As indicated above, the vertical component of the gravitational force field is actually measured at the testing station 243 located centrally on the top surface of the formation 210. Since those portions of the formation located directly below the station 243 contribute most to the gravitational value, a light field must be developed to produce a maximum light field concentration in the vicinity of the center of the graticule 225a. To this end, and as shown in FIG. 13, the openings 232a in the graticule 225a are arranged along equi-angularly spaced lines 233a, emanating radially from a point 235 positioned centrally of the graticule 225a. Immediately surrounding the center point 235 is a generally rectangular region or blind spot 235a through which no openings 232 are made, since, as indicated above, if openings were defined immediately adjacent to the point 235 a disproportionate amount of light would be transmitted therethrough. The openings 232a along each of the lines 233a are unequally spaced apart, i.e., they are spaced close together near the center point 235 and have increasing spacings as they proceed away from the center point.

In the event that the layer is cut through the formation 210 at a lower depth, at which the gravtational force field for a homogeneous density mass is of less strength, another graticule, for example the graticule 225b illustrated in FIG. 14, is used. To produce a light field corresponding to the gravity field of this deeper layer and to satisfy the second condition described above, the openings 232b on each line 233b of the graticule 225b, are spaced somewhat further apart than the corresponding openings in the graticule 225a. Thus, fewer openings 232b are employed with the result that the intensity of the light field developed by the graticule 225b is less than the intensity of the light field passed by the graticule 225a. It will be appreciated that the intensity of the field developed by each graticule may be varied by altering the spacing between the openings and/or by increasing the angular spacing between the lines radiating from the center of the graticule.

In actual use, one of the graticules and one of the geologic cross sections, both of which correspond to the same horizontal layer, are used simultaneously in the apparatus 20. The cross section is, of course, shaded in accordance with the specific gravities of the different strata encountered by the horizontal layer in cutting the formation 210. In this connection the shading is done by visual comparison to reference optical densities obtained by using the apparatus as a densitometer as described above. Alternatively, the cross section may comprise a mosaic of reference films, each of which has an optical density and configuration corresponding to the particular subsurface layer which it represents.

To facilitate the measurement of the simulated gravity value, the gravitational force field for a horizontal layer of homogeneous density mass located at a depth $z_1$ and having a thickness $\Delta z$, an infinite length and an infinite width, at the depth z, is mathematically computed. This value is then modified, in the manner described above, to compensate for the graticule "blind spot" and "edge effect," so that the modified value represents a simulated gravity value for a 5,000' by 10,000' horizontal layer of homogeneous mass having a specific gravity corresponding to the optical density of a shaded film placed on the window 27. With the film on the window 27 and the potentiometer wiper 53a set to the computed gravity value for the horizontal layer, the variable resistor 56 is adjusted until the null detector 58 is "zeroed." The film is replaced by the shaded geologic cross section corresponding to the horizontal layer of three-dimensional mass distribution and the null detector is balanced by adjustment of the potentiometer wiper 53a, as described above. By reference to the latter wiper and its associated scale the simulated gravity value for the horizontal layer is obtained. By supplying successively different graticules and cross sections corresponding to the different layers to the apparatus and repeating the above described operation, a layer-by-layer analysis of the subsurface formation is obtained, whereby the total simulated gravitational value of the entire subsurface formation is obtained by simply summing or adding the simulated gravity values for the individual horizontal layers. The order of analysis of the different layers is of no consequence since it is only necessary that simulated gravity values be obtained for all of the layers. The total simulated gravitational value is then compared with the actual gravitational value measured at the testing station 243 and, if a discrepancy exists between the two values, all or selected ones of the horizontal cross sections are modified in optical density until the measured and simulated values are equal.

In accordance with another application of the present invention, the apparatus 20 is adapted to produce a simulated or synthetic profile wherein the different strata or masses in the subsurface formations are shaded to correspond to their velocities of propagation rather than their specific gravities as in the form of the invention described above. To facilitate production of a "velocity of propagation" profile, characteristic values of travel time of elastic wave energy actually measured during a seismic survey are compared with a simulated travel time characteristic value derived from the synthetic profile, which simulated characteristic value is influenced by the shading corresponding to the variable characteristic of the velocity of propagation. This, of course, is in contrast to the use of the apparatus 20 as described above, wherein a measured characteristic value of the gravitational force field is compared to a simulated force field value which is influenced by the shading corresponding to the variable characteristic of specific gravity. In any event, the synthetic "velocity of propagation" profile pictorially represents the velocities of propagation of the various subsurface strata and is used to obtain a simulated travel time value of elastic wave energy transmitted along a predetermined path through the subsurface strata.

As is well known in the geophysical field, the travel time of elastic wave energy developed at a shot point and reflected from subsurface interfaces back to spaced seismometers is usually measured during a conventional seismic survey. Referring now to FIG. 2, there are illustrated a shot point 80 and a plurality of spaced apart, colinear seismometers 81a, 81b and 81c. The elastic wave energy developed by detonation of a charge or the like at the shot point 80 is transmitted down through the weathering layer 46 and is reflected from the various interfaces 42a, 42b, 42c etc. back to the seismometers 81a, 81b and 81c. To facilitate the explanation, only one path traversed by this elastic wave energy has been showing in FIG. 2, this path being designated by reference numeral 82 and extending from shot point 80 through weathering layer 46, through the shale stratum 44 where it is reflected by the interface 42b back through the shale stratum 44 and the weathering layer 46 to the seismometer 81a. The speed of the elastic wave energy transmitted through the subsurface strata, i.e., the weathering layer and the shale stratum, is a function of the velocity of propagation of each stratum through which it passes. Moreover, it is well known that the elastic wave energy is reflected by the subsurface interface 42b in such manner that the angle of incidence M is equal to the angle of reflection N. The seismometer 81a, as well as the seismometers 81b and 81c, are electrically connected to suitable recording apparatus for providing a permanent record containing side by side traces each of which depicts the instant of generation of the elastic wave energy at the shot point 80 and the instant of arrival of the reflected elastic wave energy at a different one of seismometers. The various interfaces may, of course, be identified by noting the order of arrival of the reflected wave energy and by comparing the arrival times of the reflected energy in the different traces. By measuring the time difference between the instant of propagation and the arrival time of the energy reflected from a particular interface, an accurate determination of the travel time of the elastic wave energy over any particular path through the subsurface formations is readily determined.

It will be recognized that if the elastic wave energy travels along a designated path through a homogeneous formation having the same velocity of propagation, then a linear relationship exists between distance and time in accordance with the equation $$D = \frac{V}{T}$$

when D represents total distance traversed by the energy, V is the velocity of propagation of the homogeneous function and T is time. Since the velocity of propagation of energy through a homogeneous mass is equal in all directions, it may be said that the travel time versus distance characteristic of a homogeneous formation is uniform. Accordingly, in the application of the apparatus 20 now being described, the gravity graticule 25 is not used and, as a result, the light field 23 having uniform distribution impinges upon the window 27. This light field is thus representative of the linear relationship existing between the travel time and distance of elastic wave energy transmitted through a homogeneous subsurface formation.

Figure 15:
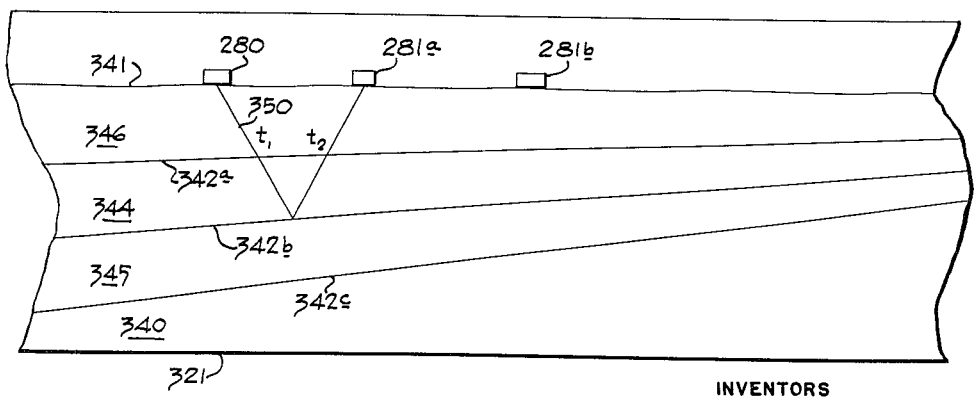
FIG. 15 is an enlarged fragmentary top plan view of another vertical geologic cross section, used when the apparatus shown in FIG. 1 is employed in producing a synthetic profile depicting the velocities of propagation of the subsurface strata or masses.

In order to alter the uniform field in accordance with the variations of velocity of propagation of the subsurface strata or masses 46, 44, 45 and 40, a geologic cross section 321 of the type illustrated in FIG. 15 is placed on the window 27. Lines 341, 342a, 342b and 342c are drawn upon this cross section to represent the air to surface boundary 41 and the subsurface interfaces 42a, 42b and 42c. Construction of these lines is, of course, facilitated by information derived during the seismic survey. Portions 346, 344, 345 and 340, which are representative of the strata 46, 44, 45 and 40, respectively, are then shaded as indicated above, to alter the optical transmissibility or density of the cross section 321 in accordance with the velocity of propagation of the respective subsurface strata. The degree of shading required for each portion 346, 344, 345 and 340 may be determined by using the apparatus 20 as a velocity meter. In this connection, the apparatus is operated in a manner similar to its use as a densitometer as described above, and reference velocity of propagation areas are obtained instead of reference specific gravity areas. The apparatus when used in this manner, provides reference shadings representative of the different velocities of propagation of the subsurface masses and these references are used in shading the cross section 321. Darker shadings are employed to represent masses having a high velocity of propagation and light shadings, of course, represent masses having a low velocity of propagation. The cross section 321, when properly shaded, has each of its different portions 340, 344, 345 and 346 shaded to correspond to the velocity of propagation of the elastic wave energy transmitted through the stratum which it represents and when this cross section is disposed within the uniform light field which is representative of the transit time versus distance field of a homogeneous mass, a modified light field is developed corresponding to a travel time versus distance distribution of elastic wave energy passing through non-homogeneous subsurface strata having the different velocities of propagation portrayed on the cross section.

In actual use, with the cross section 321 placed on the window 27, the potentiometer wiper 53a is set to a zero position relative to the scale 54b, which, as previously mentioned, is calibrated in microseconds, and the variable resistor 56 is then adjusted until the null detector needle 58a is "zeroed." With the geologic cross section in place, a heavy line 350 representative of the path 82 of elastic wave energy developed at the shot point 80 and reflected from the interface 42b back to the seismometer 81a, is drawn on the geologic cross section 321 from a simulated shot point 380 downwardly to the interface 342b and reflected upwardly to the seismometer 381a located on the surface 341. The line 350 is of predetermined width and effectively obstructs or inhibits the passage of light rays developed from the optical apparatus 22a. Since the reduction in light intensity due to the line 350 in a linear function of the length of the path, a decreased quantity of light is detected by the light responsive means 29. A line of fixed width and length causes a greater reduction in light in passing through lightly shaded areas representing masses having low velocity of propagation than it does in passing through darker areas. This means that the length of the line 350 passing through lightly shaded areas has considerable effect on the total light reaching the cell 29a, a result which should be expected since the total travel time of the elastic wave energy traversing path 82 represents the sum of the individual travel times through a relatively low velocity of propagation stratum and through a relatively high velocity of propagation stratum. If the thickness of these two strata is the same, the low velocity of propagation stratum obviously influences the total travel time to a greater degree than the high velocity of propagation stratum and, it is therefore proper that the lightly shaded areas should have a greater effect on the light reaching the cell 29a.

Due to the reduction in light produced by the line 350, an unbalance in the electrical measuring circuit 30 is deflected to an unbalanced position. The circuit 30 is rebalanced simply by adjusting the potentiometer wiper 53a until the null detector needle 58a is returned to its zero or null position. Reference to the scale 54b provides a simulated value of the transit time of the elastic wave energy transmitted over the path 82, which simulated value may be compared to the measured transit time of the elastic wave energy traversing the path 82. In the event that a discrepancy exists between the simulated and measured values, the shadings of all or selected ones of the portions 346, 344, 345 and 340 of the cross section 321 are altered so that the shadings more accurately represent the velocities of propagation of the subsurface strata. By altering the shading of the cross section portions, the amount of light transmitted through the geologic cross section is changed with the result that the null detector 58a is moved to an unbalanced position, after which the potentiometer wiper 53a is again adjusted to return the needle 58a to a null or balanced position. Repeated alteration of the optical density of portions of the cross section 321 and adjustment of the potentiometer wiper 53a is continued until a simulated travel time reading is obtained which is identical with the measured travel time value. When the above values coincide, the portion of the geologic cross section exposed to the uniform distribution light field represents an accurate synthetic profile of the corresponding part of the subsurface formation. Other sections of the cross section 321 may be moved over the window 27 to intercept the uniform field, as described above, and the above process repeated using points (not shown) representative of other shot points actually employed during the seismic survey. It should also be understood that additional lines like the line 350 may be drawn from the shot point 380 to represent reflections from any one of the other of the interfaces 342a, 342c and/or to represent energy arriving at one of the other seismometer stations 381b or 381c.

In all of the embodiments described above, that is in the production of synthetic cross sections in conjunction with a gravity survey or in conjunction with a seismic survey wherein wave travel times are measured, the cross section may be altered to change its light reflection qualities rather than its light transmission qualities. Thus, the cross sections used in the gravity system may be so altered that those portions corresponding to the low specific gravity formations reflect more light than those portions corresponding to high specific gravity formations and the light responsive means may be used to measure the light reflected from the cross section. Similarly, the synthetic "velocity of propagation" profile may be so altered that the portions corresponding to the low velocity of propagation formations reflect more light than the portions representative of the high velocity of propagation formations in order to control the total amount of light reflected to the light responsive means.

While there have been described several embodiments of the present invention, it will be understood that various modifications may be made therein which are within the true spirit and scope of the invention as defined in the appended claims.

What is claimed as new and desired to be secured by Letters Patent of the United States is:

1. The method of analyzing a simulated cross section of subsurface formations comprising the steps of creating an energy field having a distribution representing a characteristic of a homogeneous formation, altering the energy field by disposing therein a medium having portions thereof respectively representing different non-homogeneous areas of the formations, modifying the altered field by changing the different portions of the medium to represent the effect upon said characteristic of the non-homogeneities of the formations, and integrating the altered field to produce a value representative of said characteristic of the subsurface formations represented on said medium.

2. The method defined by claim 1 wherein the field is created by first developing a field having uniform distribution, and then modifying the uniform field by use of modifying means constructed and arranged to distribute the field in accordance with said characteristic of the homogeneous formation.

3. The method defined by claim 2 wherein the different portions of said medium are changed to a degree proportional to the different velocities of propagation of the respective non-homogeneous formations which these portions represent and wherein the value produced by the integration represents the total travel time of waves passing through the formations represented on said medium.

4. The method defined by claim 2 wherein the different portions of said medium are changed to a degree proportional to the different specific gravities of the respective non-homogeneous formations which these portions represent and wherein the value produced by the integration represents the total gravitational effect of the formations represented on said medium.

5. The method defined by claim 1 wherein the different portions of said medium are changed to a degree proportional to the different velocities of propagation of the respective non-homogeneous formations which these portions represent and wherein the value produced by the integration represents the total travel time of waves passing through the formations represented on said medium.

6. The method defined by claim 1 wherein the different portions of said medium are changed to a degree proportional to the different specific gravities of the respective non-homogeneous formations which these portions represent and wherein the value produced by the integration represents the total gravitational effect of the formations represented on said medium.

7. The method of analyzing a cross section of subsurface earth formations, said method comprising the steps of creating a light field having a distribution corresponding to a characteristic of a homogeneous formation, altering the light field by disposing therein a medium having portions thereof respectively representing non-homogeneities of the formations, changing the optical qualities of the different portions of the medium to correspond to the effect of non-homogeneities of the formations upon said characteristic, and integrating the altered light field to produce a value representative of said characteristic of said subsurface formations.

8. The method defined by claim 7 wherein the light field is created by first developing a light field having uniform distribution, and then modifying the uniform field by use of light modifying means constructed and arranged to distribute the field in accordance with said characteristic of the homogeneous formation.

9. The method defined by claim 8 wherein the different portions of said medium are changed to a degree proportional to the different velocities of propagation of the respective non-homogeneous formations which these portions represent and wherein the value produced by the integration represents the total travel time of waves passing through the formations represented on said medium.

10. The method defined by claim 8 wherein the different portions of said medium are changed to a degree proportional to the different velocities of propagation of the respective non-homogeneous formations which these portions represent and wherein the value produced by the integration represents the total travel time of waves passing through the formations represented on said medium.

11. The method defined by claim 7 wherein the different portions of said medium are changed to a degree proportional to the different velocities of propagation of the respective non-homogeneous formations which these portions represent and wherein the value produced by the integration represents the total travel time of waves passing through the formations represented on said medium.

12. The method defined by claim 7 wherein the different portions of said medium are changed to a degree proportional to the different velocities of propagation of the respective non-homogeneous formations which these portions represent and wherein the value produced by the integration represents the total travel time of waves passing through the formations represented on said medium.

13. The method of simulating a cross section of subsurface formations comprising the steps of establishing a light field having a distribution corresponding to a characteristic of a homogeneous mass, disposing in said light field a transparent medium having lines thereon corresponding to the boundaries of portions of said formations having different properties affecting said characteristic, shading areas of said medium between said lines to a degree proportional to the properties of the respective formation portions which the areas represent, thereby to alter the modified light field, and summing the light field transmitted through said transparent medium to obtain an indication representing the total effect upon said characteristic of the subsurface formations represented on said transparent medium.

14. The method defined by claim 13 wherein the light field is created by first developing a field having uniform distribution, and then modifying the uniform field to distribute it to correspond with and represent the distribution of said characteristic through a homogeneous mass.

15. The method defined by claim 14 wherein the areas of said medium are shaded to a degree proportional to the different velocities of propagation of the respective formation portions which these areas represent and wherein the indication provided represents the total travel time of waves passing through the formations represented on said medium.

16. The method defined by claim 13 wherein the areas of said medium are shaded to a degree proportional to the different velocities of propagation of the respective formation portions which these areas represent and wherein the indication provided represents the total travel time of waves passing through the formations represented on said medium.

17. The method defined by claim 13 wherein the areas of said medium are shaded to a degree proportional to the different specific gravities of the formation portions which these areas represent and wherein the indication provided represents the total gravitational effect of the formations represented on said medium.

18. The method of simulating a cross section of subsurface formations comprising the steps of establishing a light field having substantially uniform distribution, modifying said light field to provide a field having a distribution corresponding to the gravitational force field of a homogeneous mass, disposing in said light field a transparent medium having lines thereon corresponding to the boundaries of portions of said formations having different specific gravities, shading areas of said medium between said lines to a degree proportional to the specific gravities of the respective formation portions which the areas represent, thereby to alter the modified light field, and summing the light field transmitted through said transparent medium to obtain an indication representing the total gravity effect of the subsurface formations represented on said transparent medium.

19. The method of analyzing a cross section of subsurface earth formations having different portions respectively corresponding in configuration with different parts of said formations, said method comprising the steps of developing an energy field corresponding in distribution to the gravitational force field for a homogeneous mass, inserting said cross section within said field to modify said energy field said cross section having its different portions arranged to modify said field to correspond generally with variations in the earth's gravitational field caused by non-homogeneities of the different parts of said formations, using the total modified energy field to obtain a simulated gravity value representing the total gravitational effect of the subsurface formations represented on said cross section, comparing the simulated value with a measured gravity value, and remodifying said energy field until the simulated gravity value and the measured gravity value coincide.

20. The method defined by claim 19 wherein the field is created by first developing a field having uniform distribution, and then modifying the uniform field by use of modifying means constructed and arranged to distribute the field in accordance with said characteristic of the homogeneous formation.

21. The method of producing a simulated cross section of subsurface formations comprising the steps of developing a light field having distribution corresponding to the gravitational force field for a homogeneous mass, disposing in the light field a transparent medium having an optical transmissibility corresponding to a specific gravity less than the specific gravity of any of the subsurface formations, outlining on said medium simulated portions of said formations, altering said medium in optical transmissibility in accordance with the specific gravities of different parts of said formations corresponding to the simulated portions on said medium, summing the light transmitted through said medium to obtain a simulated gravitational value for the subsurface formations, and comparing the simulated gravitational value with a measured gravitational value to determine the accuracy of the alteration of the medium.

22. The method defined by claim 21 wherein the light field is created by first developing a light field having uniform distribution, and then modifying the uniform field by use of light modifying means constructed and arranged to distribute the field in accordance with the gravitational force field for a uniform mass.

References Cited in the file of this patent

UNITED STATES PATENTS

| | | |
|---|---|---|
| 2,474,828 | Connelly et al. | July 5, 1949 |
| 2,617,940 | Giguere | Nov. 11, 1952 |
| 2,696,891 | Neufeld | Dec. 14, 1954 |
| 2,712,415 | Piety | July 5, 1955 |
| 2,712,631 | Ferre | July 5, 1955 |
| 2,801,794 | Garvin et al. | Aug. 6, 1957 |
| 2,839,149 | Piety | June 17, 1958 |